United States Patent [19]

Lynch et al.

[11] Patent Number: 4,785,139

[45] Date of Patent: Nov. 15, 1988

[54] CABLE WITH FLEXIBLE HIGH PRESSURE EQUIPMENT ENCLOSURE MATERIAL AND METHOD OF CONSTRUCTING SAME

[75] Inventors: John F. Lynch, Boonton Township, Morris County, N.J.; Michel Y. Rondeau, San Jose, Calif.

[73] Assignee: American Telephone and Telegraph Company, AT&T Bell Laboratories, Murray Hill, N.J.

[21] Appl. No.: 868,860

[22] Filed: May 30, 1986
(Under 37 CFR 1.47)

[51] Int. Cl.[4] .............................................. H02G 15/14
[52] U.S. Cl. .................................. 174/70 S; 29/868; 138/121; 138/173; 174/50; 220/72
[58] Field of Search .......................... 174/13, 50, 70 S; 29/868; 92/34; 138/121, 122, 173; 285/226, 903; 220/3, 72

[56] References Cited

U.S. PATENT DOCUMENTS

| | | | |
|---|---|---|---|
| 607,620 | 7/1898 | Kemp | 138/173 X |
| 1,554,739 | 9/1925 | Lewis | 138/122 X |
| 1,667,793 | 5/1928 | Mauser | 220/72 |
| 1,826,666 | 10/1931 | Lawrence | 138/121 X |
| 2,034,561 | 3/1936 | Davis | 138/173 X |
| 2,341,556 | 2/1944 | Joy | 92/34 X |
| 2,465,069 | 3/1949 | Dean et al. | 174/70 S |
| 2,471,046 | 5/1949 | Smith et al. | 174/70 S |
| 2,666,657 | 1/1954 | Howard et al. | 285/226 X |
| 3,310,213 | 3/1967 | Gretter | 226/172 |
| 3,350,678 | 10/1967 | McLoad | 339/151 C |
| 3,401,576 | 9/1968 | Eckels | 138/121 X |
| 3,407,102 | 10/1968 | Wilkinson | 138/121 X |
| 3,572,393 | 3/1971 | Eisert | 138/121 |
| 3,714,311 | 1/1973 | Stefanka | 138/121 X |
| 4,172,212 | 10/1979 | Heinzer | 174/50 |
| 4,204,707 | 5/1980 | Lincicome et al. | 138/121 X |
| 4,342,612 | 8/1982 | Lalikos et al. | 138/121 X |

FOREIGN PATENT DOCUMENTS 1418946 10/1965 France .................................. 220/72

OTHER PUBLICATIONS

"A Cable Laying Facility", *The Bell System Technical Journal*, Jul. 1964, pp. 1367–1372, R. D. Ehrbar.
"Cable and Repeater Handling System", *The Bell System Technical Journal*, Jul. 1964, pp. 1373–1394, O. D. Grismore.
"Cable Payout System", *The Bell System Technical Journal*, Jul. 1964, pp. 1395–1434, R. W. Gretter.
"Mechanical Design and Test of 1200 KV Semi-Flexible SF$_6$ Insulated Transmission Line", *IEEE Transactions on Power Apparatus and Systems*, vol. PAS-101, No. 6, Jun. 1982, pp. 1630–1637, P. C. Bolin et al.

Primary Examiner—Laramie E. Askin
Attorney, Agent, or Firm—Charles Graves

[57] ABSTRACT

A flexible, high pressure housing is included in an equipment encloure between sections of a signal communication cable. The housing includes an axially compressed length of corrugated tubing in which the corrugations have been collapsed against the another. Housing ends are sealed to maintain a predetermined interior pressure in spite of variations in pressure outside the housing. Also included in the enclosure are structures for applying the outside pressure to the housing so that it is resiliently transversely flexible in response to similar outside and inside pressures but rigid in response to outside pressures much greater than inside pressures.

5 Claims, 2 Drawing Sheets

CABLE WITH FLEXIBLE HIGH PRESSURE EQUIPMENT ENCLOSURE MATERIAL AND METHOD OF CONSTRUCTING SAME

FIELD OF THE INVENTION

This invention relates to a cable which includes a high pressure enclosure for equipment in an environment which is substantially different, in at least a pressure sense, from that to which the outside of the enclosure may be subjected.

BACKGROUND OF THE INVENTION

Underwater telecommunication facility improvements over the years have brought geographically separated peoples closer together in a communication sense as well as enabling more extensive delving into the wonders of the undersea world. Such facilities usually include an electrical or lightwave signal communication cable having high pressure equipment enclosures interspersed along the length thereof. Improvements in facility hardware have largely focused upon the sophistication of equipment inside high pressure enclosures and, upon the interconnecting lengths of the cable. Enclosure technology has experienced relatively less technological improvement in the sense that robust rigid enclosures long have been employed and proportioned to enable them to withstand the rigors of pressure and corrosion at great depths in a body of water. A flavor of that technology is evident in the rigid enclosure for submarine cable system repeater components presented in U.S Pat. No. 4,172,212 to H. E. Heinzer. Such enclosures are often weighed in hundreds of pounds. During a cable system installation process, enclosures and cable are lowered into the ocean; and tensions in the cable exceed many thousands of pounds. Accordingly, the cable sections are designed to support such tensions, and the cable sections and enclosures must be designed also to withstand the enormous pressures experienced on the ocean floor.

Unfortunately, these ponderous enclosure structures also present a large discontinuity in the cable being installed due to their relatively larger diameter. Consequently, during deployment through sheaves on a cable ship, great local stress is imposed upon the cable at the points where it interfaces with enclosures and necessitates the imposition of limitations on cable design and upon the enclosure range of diameter/length ratios in order to avoid system failure. One attempt to mitigate the foregoing problem with rigid enclosures is represented by the articulated housing for a take-out connector as shown in U.S. Pat. No. 3,350,678 to K. W. McLoad. The rigid housing is also a problem in the application of braking forces to a cable as it is deployed from a cable ship because special provisions must be made to accommodate that diametric discontinuity when a portion of the cable including a housing must otherwise pass through the cable engine. More detailed background information relating to the cable and housing handling aspect can be found in a U.S. Pat. No. 3,310,213 to R. W. Gretter, and in several papers in The Bell System Technical Journal, Vol. 43, No. 4, Part 1 (July 1964). Those papers include "A Cable Laying Facility" by R. D. Ehrbar, pages 1367-1372 (indicating an unsatisfied interest in availability of a flexible housing); "Cable and Repeater Handling System" by O. D. Grismore, pages 1373-1394; and "Cable Payout System" by R. W. Gretter, pages 1395-1434.

Another aspect of the foregoing rigid enclosure problem is that involving the mentioned diameter/length ratio. Of course, the larger a rigid enclosure is in diameter and/or length, the greater will be the stresses imposed upon both the cable and the enclosure in the reeling upon and deploying from a drum or in passage through a sheave. Also, a rigid enclosure of a given diameter has a certain maximum possible length that can be sustained before the enclosure can no longer maintain its shape in a cantilever situation such as that encountered when a rigid housing passes through, e.g., a bow sheave of a cable ship. In addition, however, there are conflicting influences on enclosure design represented by, on the one hand, persistent advances in electronic and optical technology that have reduced the physical size of equipment that usually need be enclosed in a cable system enclosure and, on the other hand, increasing sophistication of functions to be performed that require additional space. The latter influence seems to be dominant at present, but it encounters the mentioned limitations on enclosure length and diameter.

Corrugated tubing has been used for various purposes in some fields, and in those uses benefit is generally taken of the flexibility of the corrugated structure in maintaining an essentially cylindrical passageway around some form of a curved path. Strength limitations of the corrugated device are usually a function of the material and its uncorrugated thickness. A corrugated aluminum enclosure is disclosed in "Mechanical Design and Test of 1200 KV Semi-Flexible $SF_6$ Insulated Transmission Line" by P. C. Bolin et al. in IEEE Transactions on Power Apparatus and Systems, Vol. PAS-101, No. 6, June 1982, pages 1630-1637. Both helical and annular, or planar, corrugations are considered. A U.S. Pat. No. 1,826,666 to A. R. Lawrence shows a pipeline expansion joint employing a corrugated tubular conduit that is provided with external reinforcing rings having inside configurations that mate with the outside configurations of the corrugations to prevent total longitudinal collapse of the corrugations. Metal of sufficient thickness is employed in the corrugated conduit to withstand the internal pressure in the pipeline.

A method for forming elastomeric material into a convoluted (corrugated) tubing with a tight pitch and for an unspecified application is taught in a U.S. Pat. No. 3,714,311 to J. A. Stefanka. Several other corrugation forming methods are shown in U.S. Pat. No. 1,554,739 to J. E. Lewis, U.S. Pat. Nos. 3,407,102 to S. C. W. Wilkinson, and 4,342,612 to J. M. Lalikos et al.

A corrugated tube is included in a collapsible steering column assembly in a U.S. Pat. No. 3,401,576 to R. E. Eckels to absorb the energy of a driver's body during an accident while leaving intact the rotational coupling function of other parts of the assembly. Alternate convolutions are formed with different diameters in a boot for a manipulator arm to reduce the minimum collapsed length of the boot in U.S. Pat. No. 3,572,393 to G. A. Eisert. Ends of an uncollapsed corrugated tube are restrained in a vibration absorbing connector of U.S. Pat. No. 4,204,707 to T. N. Lincicome et al.,

SUMMARY OF THE INVENTION

The foregoing problems of rigid high pressure enclosures are mitigated in a cable wherein a high pressure enclosure includes a housing formed of a corrugated tube in which the corrugations have been collapsed upon one another by compression. The housing is sealed to maintain a predetermined interior pressure in spite of outside pressure variations. Enclosure structures at either end of the housing axially couple ambient pressure outside the housing and cable to respective ends of the corrugated tubing to render the tubing resiliently flexible in response to similar outside and interior pressures but essentially rigid in response to outside pressure much greater than the interior pressure.

BRIEF DESCRIPTION OF THE DRAWINGS

The novel features which are characteristic of the present invention are set forth in the appended claims. The invention, however, together with further advantages may best be understood by reference to the following description taken in conjunction with the accompanying drawing wherein

DETAILED DESCRIPTION

In the description which follows, it is assumed for convenience of description that the ambient conditions for an installed cable and its equipment enclosure are those of an undersea environment at a mulimile depth. However, other high pressure environments, such as, e.g., gas, or sand, or wet dirt environments, would also be appropriate to the extent that each exhibits characteristics similar to those of the undersea environment. In the latter environment, the pressure outside the cable and enclosure typically is higher than the pressure inside the flexible high pressure housing.

Figure 1:
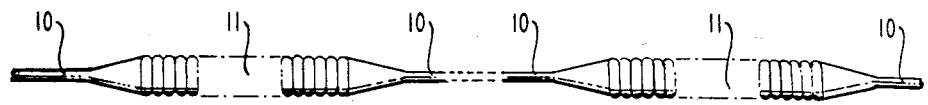
FIG. 1 is a schematic side view of a signal communication cable in accordance with the present invention.

FIG. 1 depicts a signal communication cable arrangement including plural cable sections 10 each comprising at least one signal communication path of lightguide fiber optic medium and/or electric wire or other electromagnetic energy guiding medium. Such cable sections are of any type known in the art and do not comprise a part of the present invention except as to the fact that the equipment enclosures, to be described, included in the cable allow the cable sections and anchoring means for securing them to the equipment enclosures to be designed for substantially smaller worst case tension loading than was heretofore possible.

Adjacent cable sections 10 are coupled together through equipment enclosures 11 for communication equipment. The particular type of equipment is not critical to the invention; but it could, for example, be signal processing equipment such as signal repeaters coupled for communication in the signal communication path of the coupled cable sections. Equipment enclosure detail will be considered in connection with FIG. 5; but an important aspect is a housing of compressed, corrugated, thin-walled tubing material illustrated in FIG. 2 and at least one of which is included in an enclosure 11. Such enclosures 11 are schematically represented in FIG. 1 by a series of ovals with major axes vertically oriented as is the case for planar, or annular, corrugation in which each corrugation is complete in its own plane. Another corrugation method that is also useful is a helical method in which each corrugation runs to the next as a helical screw-thread-like continuum. Annular and helical corrugation design aspects are considered in the aforementioned Bolin et al. paper for a high voltage electrical transmission line using 700–800 millimeter inside diameter uncompressed corrugated tubing. Either technique, annular or helical, is useful in housings of the present invention.

Figure 2:
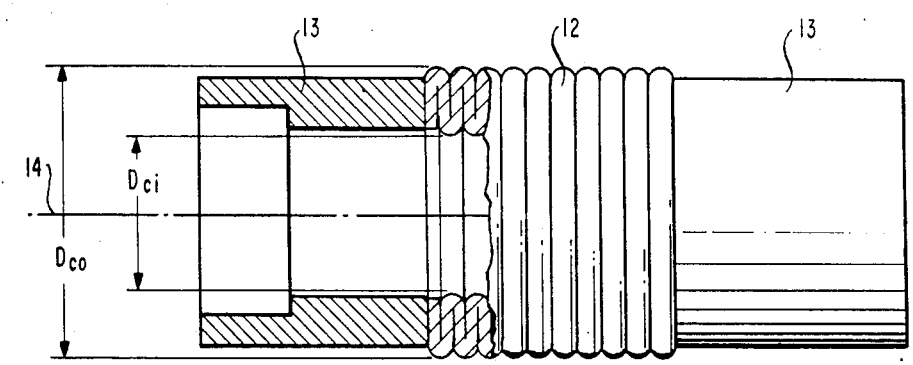
FIG. 2 is a side view partly in cross-secton of a compressed corrugated tubing housing that is useful in the cable of FIG. 1.

Shown in FIG. 2 is a compressed corrugated housing of the type included in the enclosures 11 of FIG. 1 and including a compressed corrugated tubing section 12 connected by watertight means, e.g., welding or brazing techniques, between a pair of headers 13. Those headers provide a convenient place for application of pressure axially, i.e. in a direction parallel to the central longitudinal axis of the housing, both during initial compression of the tubing to the state illustrated and when the housing is in its high pressure environment as will be described. The compressed tubing has an outer diameter $D_{co}$ and an inner diameter $D_{ci}$ indicated in the drawing and corresponding radii $R_{co}$ and $R_{ci}$.

The compression of the tubing may conveniently be effected by means of any conventional compression arrangement, a number of which are known in the art. The thin walled corrugated tubing 12 is axially compressed to a compression force determined by considerations dictated by housing diameter, corrugation geometry, and the nature of the materials employed. During the compression operation, annealing of the housing is employed as required for the particular material. Full compression of the housing is obtained advantageously by subjecting the housing to an axial load which is greater than the end loads to which it will be subjected during application of external hydrostatic pressure in the intended application, i.e. over the design working pressure maximum intended for the housing. Subsequent processing by hardening methods known in the art for the corrugated housing material chosen increases the strength of the resulting housing so it can go to even greater depths without damage.

Studies have revaled that as a result of compression to the state indicated in FIG. 2, the effective wall thickness of the housing is increased from a value of "t" (thickness of the uncorrugated material) to a value of $T = R_{co} - R_{ci}$ (thickness of the fully compressed, corrugated, housing wall). For reasons to be subsequently described, T is also called the "effective thickness" of the corrugated wall of the housing in FIG. 2.

The new geometry obtained in the compression process has been found to possess two characteristics usually considered to be inconsistent in that they cannot be realized in rigid housings, and they cooperate to mitigate the aforementioned cable stress problems. One of those characteristics is that the housing 12 and the tubing of which it is formed are flexible under conditions in which forces may be applied to bend the housing transversely with respect to its longitudinal axis 14. One set of such conditions is that of approximately equal outside and inside housing ambient pressures, e.g., at one atmosphere of pressure. Consequently, the housing can bend when subjected to such transverse forces so that it can bend with the cable in which it is used to conform approximately to the circumference of a cable drum, on which cable using the housing is stored, or of a sheave, through which the cable must pass during deployment or retrieval. A second of the two characteristics is that, when the headers 13 are restrained sufficiently to prevent longitudinal expansion of the corrugations, the housing possesses the aforementioned enlarged effective wall thickness T, i.e. the strength of the tubular wall is approximately that of a rigid solid wall of thickness T. That enlarged effective wall thickness can withstand the high pressures, i.e. large inside/outside pressure differentials, encountered on the ocean floor with ends of housing 12 sealed to prevent pressure equalization and to permit the same outside pressure to be applied axially to the ends of the housing as is applied to the rest of the housing exterior. In fact, as ambient external pressure is increased, the flexible high pressure housing becomes rigid. The combination of the two characteristics, low-pressure flexibility and high-pressure rigidity, yields a housing that is both flexible at atmospheric pressure, where flexibility is desirable for accommodating the shapes of drums and sheaves, and rigid at higher ambient pressures, where the strength of rigidity is desirable for resisting the crushing pressure differentials of the underwater environment.

The choice of material to be used in the corrugated housing is a function of various factors related to a particular application and including, e.g., corrosion resistance, ductility, and the material yield strength needed to withstand anticipated worst-case pressures without material failure in whatever mode the housing configuration is most susceptible to failure. In this sense, the yield strength of the material used is independent of its thickness and is the principal factor of concern for describing the present invention. At this point it is useful to note that hoop stress is often an important factor in failure of a generally cylindrical body, such as the housing 12, which is subjected to essentially uniform radial inward pressure. Under that condition, the pressure produces equal opposed circumferential stresses in the body; and when those stresses exceed the yield strength, i.e. shear stress limit, of the material by a sufficient amount, failure results.

It can be shown that for housings of the type here under consideration, the required material strength is dictated by thick-wall housing theory. That is, a compressed corrugated tubing with ends restrained against axial movement might fail in one of at least two ways. These include out-of-plane buckling (material yields in bending and outer portions of a corrugation fold axially along the tube toward an adjacent corrugation), and radial buckling (either material yields in bending and outer portions of a corrugation collapse radially inward with the peak moving radially inward toward the root or material yields in tension and corrugation root is torn away from sidewalls). A housing will often yield to a limited extent, e.g., because of irregularities in the material used, by going out of round; but the housing shape remains otherwise stable and is actually somewhat strengthened. In applications illustratively considered herein, where the housing is subjected to substantially higher pressures outside the housing than exist inside the housing, out-of-plane buckling is unlikely because ambient pressure acting inwardly in all directions, including axially, exerts forces which resist any such tendency. Also, it can be shown that radial buckling will not occur if one selects a housing material with a yield strength greater than the worst-case hydrostatic pressure to which the most failure-prone part of the housing will be subjected in the compressed corrugation format considered herein.

Figure 3:
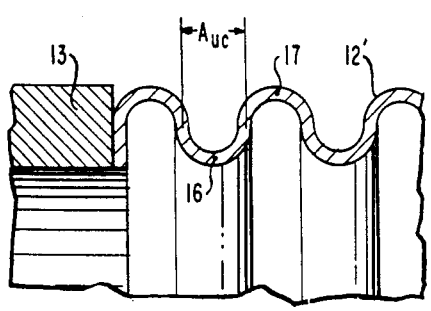
FIGS. 3 and 4 are partial cross-sectional diagrams of corrugated tubing in uncompressed and compressed states to illustrate one aspect of the invention.
Figure 4:
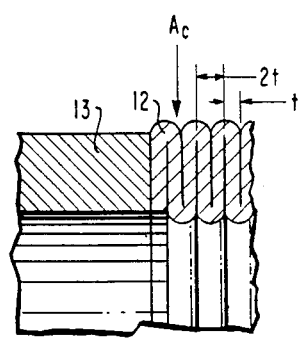

FIGS. 3 and 4 represent enlarged, uncompressed and compressed versions, respectively, of the upper left corner of the housing tubing cross section shown in FIG. 2. Assume for the purposes of this part of the description that the header members, or headers, 13 are restrained, by means not shown, to maintain the corrugation relationships shown in FIGS. 3 and 4, respectively. If the pressure outside the corrugation, $P_o$, is increased with respect to the pressure, $P_i$, inside the corrugation, e.g., as in a laboratory pressure chamber simulation of lowering the housing into a multimile-depth underwater position, the entire outer surface of the corrugated tubing 12' or 12 is exposed to the crushing force of the increasing differential pressure $P_o$ minus $P_i$ between outside and inside pressures. The smallest-diameter, or root, portion of a corrugation, e.g., at point 16 in FIG. 3, is at greatest risk of failure because of the total force, hoop stress, due to hydrostatic-pressure on it; and there is only the inherent strength (yield strength) of the material to resist. However, the corrugation peak portion, e.g., at a point 17 in FIG. 3, is at relatively less risk because the corrugation sidewalls help it to resist the inwardly crushing force of the hydrostatic pressure. That pressure squeezes the peak portions and spreads the root portions until out-of-plane collapse occurs and the housing is crushed. The total force exerted on the uncompressed root portion 16 is a function of its area $A_{uc}$, i.e. the product of the circumferential length of the root portion between adjacent corrugation walls and the axial length of that root portion between those sidewalls in a direction parallel to the longitudinal axis 14 of the housing 12'. If the differential pressure is 12,000 pounds per square inch (psi), e.g., equivalent to about four miles under the surface of the sea, acting on an area $A_{uc}$ about 0.5 inch in axial length and 3.14 inches in circumference, the force is about 19,000 pounds. Since such a force induces a stress which is in excess of the shear stress limit of, e.g., beryllium copper material illustratively considered, material failure is certain to occur.

Now if one shifts to consideration of the compressed-corrugation embodiment of FIG. 4, a narrow-root theory is believed to explain findings that this embodiment is highly resistant to failures of the type just described. In FIG. 4, all but one of the parameters of FIG. 3 are retained; and that one is the root axial length between sidewalls of the adjacent corrugations under consideration. As to that one, the axial length is essentially reduced to a point indicated by the tip of the arrowhead adjacent to the reference character $A_c$ representing the root portion circumferential area in the FIG. 4 compressed embodiment. The corrugated tubing has been compressed to the point that the sidewalls extend in approximately a radial direction with respect to the housing longitudinal axis 14, i.e. they touch one another at least adjacent to the peak portions on the outside of inside of the tubing. Axial length of the root is thus reduced to about 0.05 inch, sometimes said to be a linewidth length, in the illustrative example being considered. In the configuration, corrugation sidewalls are approximately in principal surfaces perpendicular to the housing longitudinal axis and require no extra material to withstand shear forces. The total force exerted on the typical root portion is only about 1884 pounds. Since such a force induces a hoop stress which is below the shear stress limit of the illustrative beryllium copper material considered, material failure is unlikely to occur.

Once the housing parameters of material selection and required effective wall thickness have been determined, as will be described, as a function of the rigidity needs of the worst case pressure environment, the flexibility requirement is satisfied by the nature of corrugated housings. That flexibility requirement is a function of forces available to bend, i.e. increase the enclosed volume of, the housing under whatever the ambient conditions may be, e.g., at the surface or at shallow depths. It is assumed that at the worst case pressure depths of interest, there will be insufficient unbalanced force applied (in deployment and anticipated forces of irregular lies or underwater animals or underwater vessel action) to effect a bending that could open corrugations sufficiently to render the narrow-root theory of nonfailure invalid and result in failure of the housing by tearing of the thin-wall material during radial collapse. Such events are not problems at or near the surface where there is insufficient ambient pressure difference between inside and outside of the housing to cause either of the noted types of buckling.

A consequence of the foregoing is that one should select a material which has a sufficiently high yield strength that it would not be expected to experience plastic strain, i.e. permanent deformation, at the corrugation root when subjected to worst-case anticipated pressure. Then trial and error calculations, using known thick-wall housing theory relationships, are made to determine a set of housing outside and inside diameters that will withstand that pressure without reaching the material yield strength. It has been found that a compressed corrugated housing of that same material and the trial-and-error-selected thick-wall effective thickness will withstand the crushing force of, i.e. resist flattening due to, the worst-case hydrostatic pressure environment.

The material employed in a flexible high pressure housing of the type here described must evidence high mechanical strength, ductility, and corrosion resistance. This combination of properties, including the strength required to withstand the stress of the worst case pressure conditions in the narrow-root-theory, compressed, corrugated housing, is found in several ferrous and nonferrous alloys. Studies have revealed that the most advantageous materials for the described housing for multimile undersea application are certain copper-nickel-tin or copper beryllium alloys falling within a single phase (alpha) region of their equilibrium phase diagram at temperatures near the melting point of the alloy but within a two-phase (alpha +theta) region at room temperature when (1) pretreated to a supersaturated single phase alpha structure at room temperature having medium to fine grain size; (2) formed to the desired compressed corrugation shape; and (3) aged at a critical temperature. These alloys evidence yield strengths which are among the highest achieved in the metallurgical art. Other materials which may also be in the practice of the present invention include ferrous and nonferrous alloys which exhibit adequate mechanical strengths for intended application.

In the fabrication of the flexible high pressure housing of the invention, the alloy selected from among the ones hereinbefore mentioned for use is shaped into the form of a corrugated tubing advantageously having a material wall thickness within the range of approximately 5-100 mils. It has been determined that material of a thickness less than approximately 5 mils is unnecessarily fragile and has increased likelihood of material fracture during the housing formation processing whereas material of a thickness more than approximately 100 mils is unnecessarily bulky and requires unnecessarily great effort for the material shaping processing.

It has been hereinbefore mentioned that uncompressed-corrugation tubes have been used to protect electrical cables while retaining a certain degree of lateral flexibility that allows the tube to follow a curved path. In those applications, the corrugated tubing exhibits its greater resistance to crushing than would a smooth cylindrical tube that usually exhibits a lower degree of curve following flexibility. The higher crush resistance arises from the well known fact that a planar piece of material flexes readily about a first axis in the plane of the material; but if a single corrugation is imparted to the material about a second axis in the material, which corrugation and second axis are perpendicular to and extend through the first axis, the material is much more rigid with respect to bending about that first axis. An uncompressed corrugated tube takes advantage of that property to exhibit high crush resistance. However, the hoop stress limit for the latter configuration is still a function of the thickness of the precorrugation material. It has been found that when the corrugated tube is compressed to the aforementioned radial-wall state, illustrated in FIG. 2, yielding at the corrugation root is no longer the primary failure mode of concern., That is, the compressed-corrugation tubing now exhibits a hoop stress limit (i.e. inward bending plastic deformation at the housing ID), with tube ends restrained, approximately that of an uncorrugated tubing of like material having a thickness corresponding to one-half the difference between the OD and ID of the compressed corrugation tube. Stated differently, the pitch of the corrugations is no greater than a value at which hoop stress in the corrugations, in response to exterior pressure much greater than interior pressure, is no greater than the shear stress limit of the tubing material. For example, the hoop stress limit (housing fails by corrugation root tearing) for an uncompressed-corrugation tubing of copper-nickel-tin (spinodal alloy), 0.017 inch thick, 1.25 inches housing ID, and about 0.300 inch difference between OD and ID, is about 3,000 psi, as compared to experience showing that a compressed-corrugation tube of the same material and an effective wall thickness for about the same difference in OD and ID has not failed at either that pressure or any higher pressures that have been applied up to 20,000 psi.

Figure 5:
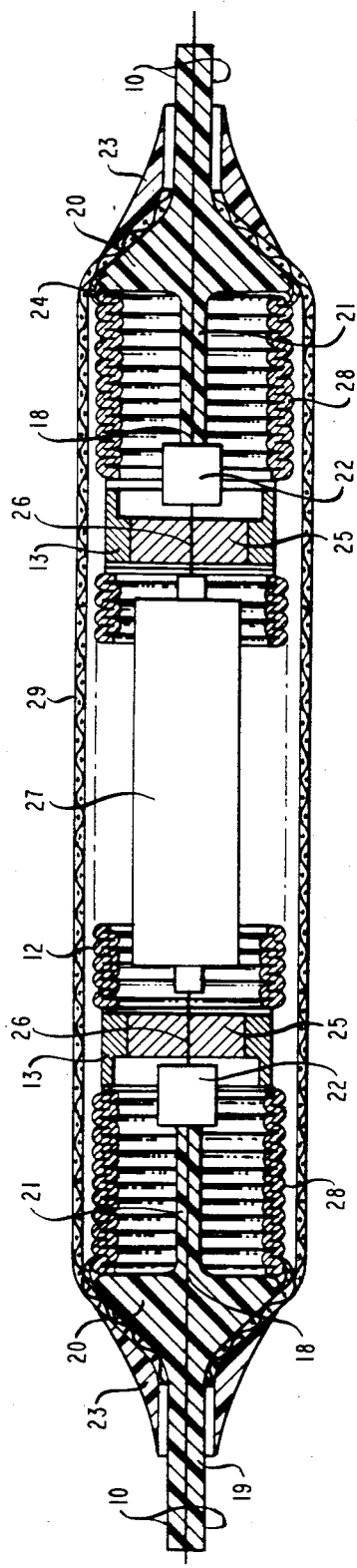
FIG. 5 is a side view in cross-section of a cable equipment enclosure including a housing in accordance with FIG. 2 and useful in the cable of FIG. 1.

FIG. 5 is a front elevational view in cross-section of a flexible enclosure 11 assembly including the cable sections 10 on either end and a housing 12 with its headers 13 within. Left-hand and right-hand (as illustrated) ends of the enclosure are essentially mirror images of one another so only one will be described. Since many aspects of cable enclosure technology are well known in the art, the description will be in only sufficient detail to enable understanding of the illustrative application of compressed, corrugated housings of the type illustrated in FIG. 2.

The cable signal path includes various equipment parts interconnected by at least one lightwave fiber, or electric current wire, guide 18 inside a nonconducting, for signals, protective jacket 19 of, e.g., polyethylene within the cable 10. In the cable anchoring portion of the enclosure 11, the jacket 19 material is expanded into a cone 20. However, inwardly in the enclosure 11 from the cone 20 the guide 18 and its jacket 19 possibly includes a coiled, length-compensating portion 21 (coiling not specifically shown) prior to entry into a splice box 22. A semirigid boot 23, e.g., also of polyethylene, encloses an end portion of cable section 10 and a part of the cone 20 to restrict the degree of bending that can occur at the cable-enclosure interface as is well known. That boot is of substantially smaller diameter and length than was heretofore possible because the compressed corrugated housings employed in the cable can be of much greater length, and hence smaller diameter, than was heretofore possible for housings of like internal volume in a similar cable application. Boot 23 is secured by bonding to the outer portion of wedge 20 and a tension bypass 29 (to be described), but the boot has only a relatively loose fit with respect to the jacket 19 to allow limited relative movement between 19 and 23 during cable bending.

The splicing chamber 22 is provided to contain a signal path junction between the guide 18 and a guiding pigtail 26, with slack (not shown) to accommodate some of the enclosure bending during deployment or retrieval of the cable. Pigtails 26 are passed through seals 25 of any suitable type in the headers 13 to couple guide 18 to either end of signal processing equipment schematically represented by an equipment box 27. Such feed-through seals per se are known in the art; and one example is shown at pages 2392-2393 of "SG Undersea Cable System: Repeater and Equalizer Design and Maintenance" by C. P. Anderson et al., The Bell System Technical Journal, September 1978, pages 2355-2403. Seals 25 maintain approximately a predetermined interior pressure, e.g., atmospheric, within housing 12 even though exterior pressure may vary substantially. That box representation may include alternatively, instead of a single box plural encapsulated equipment modules connected in tandem by respective additional pigtails, each such further pigtail being enclosed in a lightweight corrugated bellows, which acts as a spring to hold encapsulated modules at a certain spacing with respect to one another and to accommodate bending of housing 12 without damage to the contained equipment. The housing 12, with its headers 13 and seals 25, encloses the box 27. It will be appreciated, of course, that the permissible amount of elastic strain, temporary deformation, in housing 12 will be a function of clearance allowed between box 27 and the inside, corrugation root portions, of housing 12.

Each splice box 22 and the associated portion of guide 18 between it and the cone 20 are included in a further compressed corrugated housing 28 similar to the housing 12. However, each housing 28 has no additional headers associated with it. It is welded or brazed to the outermost (from box 27) end of the closest header 13 and suitably bonded to the outer edge of cone 20. In addition, a locking collar 24 is advantageously provided at each wedge-housing bonded interface to add tension strength. Within each housing 28, the enclosed splice box 22 is located near the inner (closest to box 27) end of the housing so that splicing personnel can reach into the box to perform the signal path splice before housings 28 are joined to headers 13. The splice box will have previously been coupled to an end of cable section 10 before its enclosing housing is secured to the anchor end of the enclosure 11. Housings 12 and 28 are advantageously filled with nitrogen or other inert material.

A flexible tension bypass 29 encloses the three housings 12 and 28 and extends between anchor regions, i.e. cones 20, of the enclosure 11. The bypass is advantageously a sleeve of woven beryllium copper strands secured at their ends between the inner surface of boot 23 and the outer surface of wedge 20. A small preload tension is imposed on bypass 29 during installation to be sure that there is no substantial extension of the housings 12 and 28 during cable deployment. Bypass 29 is typically further enclosed in a flexible, protective sleeve (not shown) of, e.g., polyurethane or other flexible organic material, bonded to cones 20 and containing a pressure compensating fluid, such a grease, to keep pressure inside and outside the sleeve essentially the same. Hydrostatic pressure flexes the sleeve to press the grease through the bypass 29 against housings 12 and 28. During the initial phase of cable deployment, the ends of bypass 29 are gripped between the cones 20 and respective boots 23 so that the bypass transmits tension between cable sections 10 around the housings. Also, when the cable and an enclosure are passed around the curved surface of a drum or sheave, the bypass woven sleeve is able both to xpand at its outermost circumferential portion away from the center of curvature and to contract at its innermost circumferential portion closest to the center of curvature.

As the aforementioned deployment continues, and the deployed depth of an enclosure increases, hydrostatic pressure increases, acting in all directions, including through the bypass strands as just described, on the exterior of the housings 12 and 28. Two of those directions are opposite axially directed forces from each end toward the longitudinal center of the enclosure 11, through the boots 23, the wedges 20 of the anchor regions, housings 28, and headers 13 to the housing 12.

The result of the mentioned transmission of forces is that the corrugation compressed state is maintained and enhanced so that the housings become rigid as hydrostatic pressure increases. Hydrostatic pressure acting radially on the outsides of a housing, as previously described, is unable to force the corrugations open or otherwise mechanically damage the housings and contained equipment. Even in the event that in some application the cable section 10 outer diameter is essentially the same as the outer diameter of enclosure 11 there will be sufficient axial force applied to maintain the housing rigidity.

Flexible high pressure housings fabricated in the foregoing manner have been hydrostatically tested at pressures ranging up to 20,000 pounds per square inch, such being equivalent to pressures experienced at depths of about 8 miles, or 7300 fathoms, in the ocean. Under high pressure conditions of 11,000 psi the housings were found to be structurally sound with a helium leak rate less than $2 \times 10^{-11}$ standard cc per second per pound per square inch, essentially leak tight. Accelerated life testing has revealed that the housing of the invention is capable of successfully housing electronic components in an essentially dry (less than 50% relative humidity) ambient for a time period in excess of 20 years.

In addition to the advantages of relative ease of manufacture of high pressure housings, other advantages flow from use of compressed-corrugation housings of the type here described. For example, in addition to the rigid housing problem of extra stress on adjacent cable sections when a rigid housing is passed around sheaves, there is a question of cantilever type loading on the housing in the same situation. If a rigid housing is made with a diameter approaching that of the adjacent cable sections, the useful internal volume is limited. The reason is that a housing of a length that is necessary to accommodate a certain required internal volume may bend, kink, and possibly break under the cantilever loading experienced when, for example, the housing goes over a bow sheave of a cable ship following plural miles of cable being deployed but not yet resting on the bottom of the ocean. On the other hand, a flexible high pressure housing of the type herein described readily bends, without failure, to accommodate the shape of radii that are typical of cable ship bow sheaves, i.e. radii of three to six feet. This means then that a compressed-corrugation housing diameter and wall thickness can be designed as appropriate for a particular cable system application, and then housing lengths can be selected to suit each particular cable system equipment need without the necessity for redesigning a totally new housing for each such need.

To illustrate the foregoing, assume an application in which a housing equipment volume $V_O$ of 30 in$^3$ is needed in a system in which cable tension may reach 8,000 pounds; a minimum sheave diameter of 40" is available a design yield stress material of approximately 30,000 pounds per square inch is employed; and the housing is intended for a hydrostatic pressure ranging up to 12,000 pounds per square inch. A flexible high pressure housing (FHPH) having an outside diameter, $D_O$ of 2 inches and a length, L, of 26 inches would be suitable. In contrast, a rigid high pressure housing (RHPH) of the prior art, and of the same equipment housing diameter, could not provide the same volume because its length could not exceed about 8 inches without undue risk of fracture at the cable housing interface during deployment.

Figure 7:
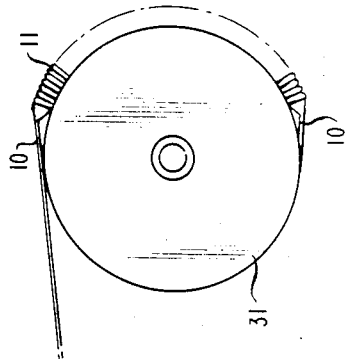
FIGS. 6 and 7 are simplified diagrams of cable sections and enclosures on cable handling sheaves.
Figure 6:
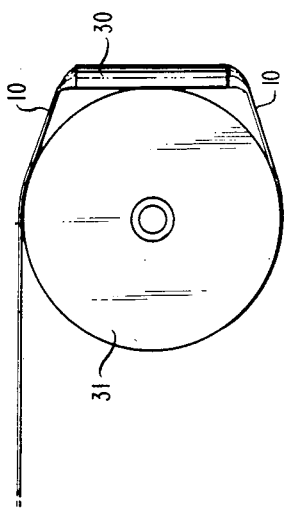

FIGS. 6 and 7 are simplified diagrams of cables with equipment enclosures passing over a drum or sheave of cable handling equipment (not specifically shown) to illustrate the contrast between situations for rigid, in FIG. 6, and flexible, in FIG. 7, cable equipment enclosures. In FIG. 6 a rigid enclosure 30 between two cable sections 10 is on a drum 31. Cable is being pulled off the drum toward the left as illustrated. The drum has a diameter, e.g., about 40 inches, that is suitable for spooling cable including flexible enclosures of the type here disclosed. The smallest practical rigid enclosure would be about 24 inches long and 6 inches in diameter and would usually be associated with drums six or more feet in diameter. A troublesome situation, i.e. cable kinking and possibly breaking at the interface between a cable section and the enclosure, prevails primarily for rigid enclosures with respect to any drum, e.g., on a cable engine, over which the enclosure 30 must pass; and the severity of the situation for any given rigid enclosure diameter increases as the drum diameter used decreases. As cable is taken from the drum, a part of the lead cable section 10 tends to go relatively slack and then normal tension resumes briefly before the enclosure 30 comes off the drug and tends suddenly to increase tension again as the slack at the other end of the enclosure is taken up. Substantial care is required in the operation of braking mechanisms to contain the tension gyrations within an acceptable range.

In FIG. 7, the flexible enclosure 11 has a small diameter of about two inches and resiliently conforms approximately to the drum 31 circumference so the problem of variable tension loading due to diametric discontinuities in the cable is greatly reduced. After enclosure 11 has passed around drum 31, the enclosure and its included housing 12 return to their normal straight alignment as shown in FIG. 5. Similarly, much less of cable sections 10 is pulled away from the drum; and, hence, much less opportunity is presented for rapid changes in cable tension as the cable sections and enclosure are deployed. Bending of the enclosure in FIG. 7 is accommodated by the flexible bypass as previously described and by the flexible housings, now at atmospheric pressure. In those housings, the portions of corrugations closest to the center of drum 31 remain in touching contact with one another, but the portions of corrugations farthest from the center of drum 31 separate to a limited extent as required by the drum diameter.

Although the foregoing description has focused upon the use of the high pressure housings in underwater applications, it will be appreciated by those skilled in the art that the housings are suitable for terrestrial applications where there is a need for small diameter equipment housings, i.e. more closely conforming to cable diameter, to permit smaller cable and equipment storage areas and easier handling and installation techniques.

What is claimed is:

1. An equipment enclosure comprising a tubular housing having a transversely corrugated tubular wall extending along the entire length of said housing in which the corrugations have been compressed upon one another so that corrugations extend essentially radially with respect to the central longitudinal axis of said housing and sidewalls of adjacent corrugations are in contact at least adjacent to the peak portions on the outside of said housing and adjacent to the root portions on the inside of said housing, said housing being formed of a material which allows said housing to be resiliently bent with respect to said axis in response to application of transverse forces in the presence of approximately similar exterior and interior static pressures, means sealing an interior region of said housing to maintain approximately a predetermined interior pressure value even though exterior pressure may change, and means at respective opposite ends of said tubular housing for receiving oppositely directed longitudinal forces due to exterior pressure to render said housing essentially rigid in the presence of exterior pressure much greater than said interior region pressure.

2. In a cable including a signal path extending through at least two cable sections and through an equipment enclosure coupled between said sections, the improvement in said enclosure comprising a tubular housing having a circumferentially corrugated tubular wall in which the corrugations have been compressed upon one another so that adjacent corrugations are in touching relationship at least in corrugation wall regions near the outer circumference thereof and in corrugation wall regions near the inner circumference thereof, said corrugations leading said housing a predetermined degree of bending flexibility to accommodate bending of said cable, means coupling said at least two cable sections to opposite ends of said housing, and means sealing an interior region of said housing to maintain a predetermined pressure therein even though pressure outside said housing may vary, thereby rendering said housing relatively rigid in response to outside pressure substantially greater than said interior region pressure.

3. The cable in accordance with claim 2 in which said enclosure further comprises an outside-pressure-permeable, tension bypass, flexible member enclosing said housing, and anchoring means coupling opposite ends of the tension bypass flexible member to said at least two cable sections, respectively, to bypass longitudinal tensile forces in the cable around the housing.

4. A process for manufacturing a communication cable for use in an environment of pressure much higher than atmospheric pressure, comprising the steps of forming a tubular member to have transverse corrugations along at least a portion of the length thereof, said corrugations being collapsed upon one another such that corrugation side walls are essentially radial with respect to said tubular member, and root portions between adjacent corrugation side walls are of essentially line-width length in the direction parallel to the longitudinal axis of said tubular member.

sealing the ends of said member to form a housing and to maintain a predetermined interior pressure therein, applying to said ends of said member pressure receiving devices for transmitting to respective ends of said member longitudinal forces resulting from pressure which is expected to be encountered in the environment in which said housing is to be used and for thereby tending to maintain said housing in a minimum enclosed volume configuration, and assembling at least one housing so formed between adjacent cable sections to form a completed communication cable.

5. A housing for signal communication equipment in a signal communication cable for use in an environment of much higher pressure outside of said housing than within the interior of said housing, said housing comprising a tubular member having annular continuous corrugations around said member along the entire length thereof, saids corrugations having corrugation side walls that are essentially radial with respect to the longitudinal axis of said tubular member and root portions between adjacent corrugation side walls that are of essentially line-width length in the direction parallel to said longitudinal axis of said tubular member, said continuous corrugations being of a pitch that is no greater than a value at which hoop stress in the corrugations, in response to exterior pressure much greater than interior pressure, is no greater than the shear stress limit of said tubular member, and pressure receiving means secured to each end of said tubular member for directing exterior pressure longitudinally with respect to said member against each end of said member.

* * * * *